Oct. 2, 1934.  W. A. BOUGHTON ET AL  1,975,080
METHOD OF MAKING MOLDED LAMINATED MICA PRODUCTS WITH INORGANIC BINDERS
Filed March 18, 1932

Inventors:
Willis A. Boughton
and William R. Mansfield,
by Warren G. Ogden
Att'y.

Patented Oct. 2, 1934

1,975,080

UNITED STATES PATENT OFFICE 1,975,080

METHOD OF MAKING MOLDED LAMINATED MICA PRODUCTS WITH INORGANIC BINDERS

Willis A. Boughton, Cambridge, and William R. Mansfield, Boston, Mass., assignors to New England Mica Co., Waltham, Mass., a corporation of Massachusetts Application March 18, 1932, Serial No. 599,844

11 Claims. (Cl. 18—56)

This invention relates to molded laminated mica products with inorganic binders and methods of making the same.

An object of this invention is the production of molded mica products formed from laminated mica sheet bonded with an inorganic binder.

Another object is the production of such molded products which are heat resistant up to the temperature of decomposition of mica itself.

Another object is the preparation of molded laminated products which when subjected to high temperatures will not char or burn, nor delaminate, nor suffer marked decrease in electric resistance.

Other objects are the production of high temperature electrical heating element supports in some electrical appliances; immersion and surface heaters, space heaters, flame protectors, direct heat protectors, molded resistance wire supports of many kinds, and the like.

Other objects will be apparent to those skilled in the art of making molded laminated mica products.

Heretofore, the electrical trade in general, and other industries, have had to rely on organic bound laminated mica for such molded or formed mica products as tubes, rings, cones, cylinders, etc., and have in consequence suffered the inconvenience and limitations in use imposed by the inherent nature of the organic binder employed, especially its decomposition, charring, fuming, and burning at the higher temperatures, resulting in delamination of the products, and consequent loss of electrical resistance. Similar articles made of porcelain, fireclay, and other inorganic plastics were found to resist higher temperatures but have the disadvantage of fragility, excessive rigidity, etc., and in the case of tube supports for wire, require molded grooves.

Laminated mica products with inorganic binders have previously been prepared (see Dawes and Boughton Patents 1,578,812, and 1,578,813, and pending applications of Boughton, Serial Numbers 507,991, 546,153, and 546,154). These Boughton applications describe in detail the nature and method of employment of the inorganic binders used in the preparation of molded sheet products made according to the present invention. It was found, however, that the methods customarily employed in the manufacture of organic bound tubes, cylinders, rings, etc., were not adapted, without modification, to the preparation of satisfactory similar products with inorganic binders. Consequently, a new method was devised, dependent on and related to the novel nature of the inorganic binders employed, this new method or procedure being the subject matter of this invention.

In the preparation of such molded products as herein referred to, we prefer to use an alkali metal metaphosphate, such as sodium metaphosphate, as the binder, although we may employ other binders as described in the Boughton applications referred to. To the colloidal aqueous association of sodium metaphosphate there may be added a crystallization restraining substance, for example, sodium arsenite, or sodium tungstate, as described in said Boughton application, Ser. No. 546,154. All of the binders described in the above applications, and adapted for use in the present invention, are viscous and adhesive at ordinary temperatures through colloidal association with water, and later at maximum temperatures are again viscous and adhesive through glassy fusion.

In the preparation of tubes, for example, we prepare a concentrated aqueous solution of glassy sodium metaphosphate and dilute it with water to 25-40 percent concentration by weight, the higher concentrations yielding greater cohesion of the resulting product, and the lower, greater freedom from oozing at higher temperatures. A laminated mica sheet of suitable size and thickness is prepared in the usual manner with the above described liquid as binder. The solvent is then partly removed from this highly flexible sheet by quickly heating and rolling on a hot table, during which operation protection of the surface as by covering with sheets of canvas or other cloth or sheet material is desirable. The sheet thus dried but still somewhat flexible, may be used as such (Condition 1) to prepare the tube, or it may be further heated (up to approximately 200° C.–300° C., (392° F.–572° F.)), and dehydrated under pressure as in a press. (Condition 2.) In either instance, when heating and dehydration have been carried to the desired point the plate is cooled and trimmed to a size slightly larger than that finally required, and formed into a tube by warming to flexibility (at a temperature of approximately 110–120° C. (or 230–248° F.), when in Condition 1, and roughly 300° C. (or 572° F.), or to approximately the temperature used for prior heating, when in Condition 2), the exact temperatures being subject to choice, and depending only on the temperature of prior heating, and then rolling the highly flexible sheet around a protected metal or other rod or dowel or form, by hand or in a machine, adhesion between layers being secured by application of an additional coat of binder, with or without further drying. After the tube is formed the lap is temporarily held in position, and the rod is removed.

As a variation of the tube shape there may be formed a spring or helix of laminated mica by winding a strip of the desired width and thickness coil-wise around the rod or dowel, fastening the ends of the mica strip to hold them in temporary position during the remainder of the process.

Thus far the process of manufacture in its essential details is that commonly employed for the manufacture of tubes with an organic binder. The following additional steps are those required for the production of tubes with inorganic binders capable of use at elevated temperatures.

The tube, now cold and hard but capable of again becoming somewhat moldable upon moderate application of heat, is heated to a temperature of about 540° C.–620° C. (1004–1148° F.) to dehydrate the binder and convert it into a substantially anhydrous viscous, adhesive fluid, in which condition it firmly cements the adjacent surfaces of the mica flakes in the formed mica product, so that when cooled a solid integrated article is produced. Organic adhesives are obviously carbonized or destroyed, and cease to function as binders at the preferred baking temperature.

We may also use a laminated mica plate prepared with inorganic binder and pressed at about 175° C.–180° C. (about 350° F.), as described in the Boughton application, Serial Number 521,378, for the preparation of molded products. In such a case, the plate in tough resilient sheet form is warmed if necessary to approximately the temperature of prior heating when the binder softens and the plate becomes moldable. It is then shaped to the desired form and contacted layers are cemented together as described above, the process thereafter being as described.

In the accompanying drawing.

Figure 1:
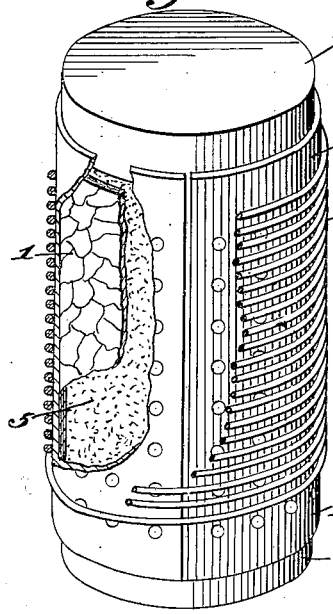
Fig. 1 is a view in perspective and partly in section showing one modification of a means and method of baking a built-up mica tube, in which the interior of the tube is filled with sand or other refractory material, and surrounded with a perforated metal sheet, the latter being bound with wire or ribbon; with the ends closed by plugs.
Figure 2:
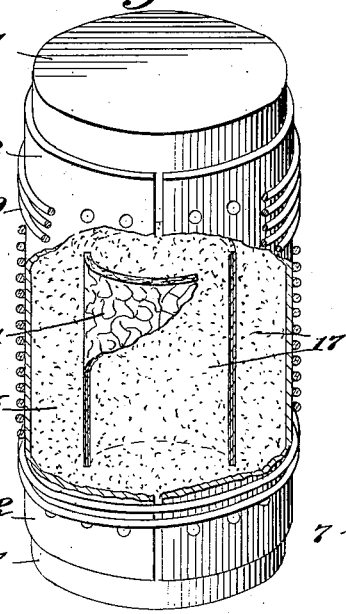
Fig. 2 is a view of a further modification in which the built-up mica tube is embedded in sand, but otherwise resembling Fig. 1.
Figure 3:
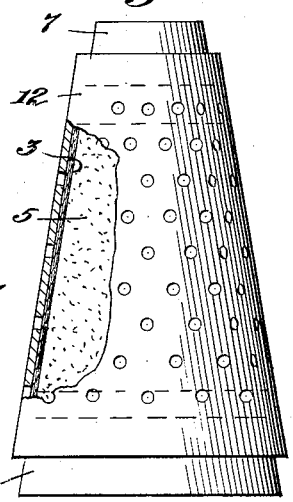
Fig. 3 is a view of a further modification, showing a cone-shaped built-up mica product, with the outside surrounded by a perforated metal cone.
Figure 4:
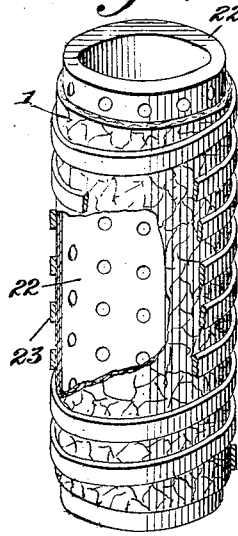
Fig. 4 is a view of a further modification in which the built-up mica tube is placed over a perforated metal tube, and wound on the outside with metal ribbon.
Figure 5:
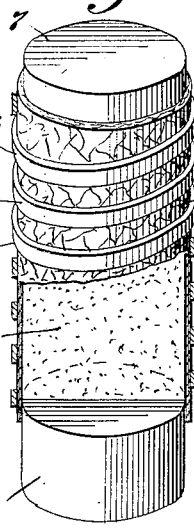
Fig. 5 is a view of a further modification, resembling Fig. 1, in which the outer metal sheet and binding wire are replaced by a metal ribbon, as in Fig. 4.
Figure 6:
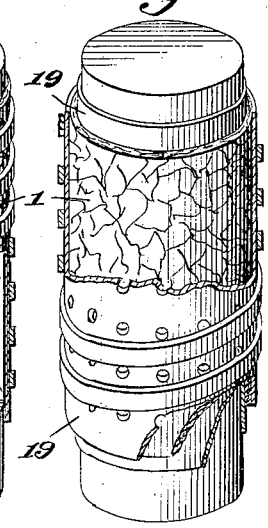
Fig. 6 is a view of a further modification in which a solid core is covered with sheet wood or paper, upon which is placed the built-up mica tube, and then covered with a perforated metal sheet, the latter being bound with metal wire or ribbon.
Figure 7:
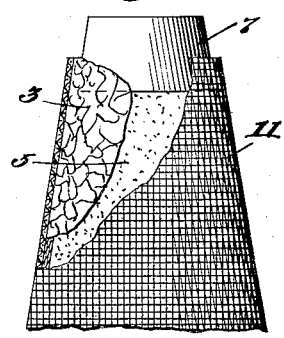
Fig. 7 is a broken view of a further modification resembling generally Fig. 3, in which the outer perforated metal cone is replaced by a metal screen structure.
Figure 8:
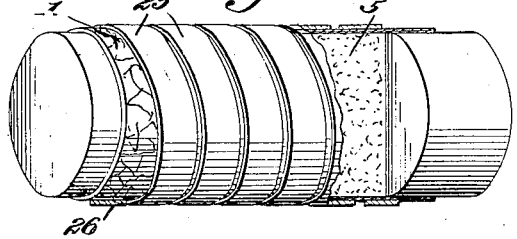
Fig. 8 is a view of a further modification resembling generally Fig. 6, in which the mica tube is surrounded with a coil of metal foil.

Since evolution of the solvent (colloidally held water) proceeds continuously as the temperature rises, both surfaces of the molded product must be held under compression during the operation of heating by a suitable type of vented mold as described hereafter. This may be accomplished by enclosing the product 1 in a suitable foraminous mold 2, Figs. 1 and 2, with surfaces of such a nature as not to adhere strongly to the fluid binder. Preferably, in the case of cylindrical 1, cone 3, Figs. 3 and 7, or other shaped or molded products, compression against the inner surface is secured by tamping within the interior dry sand 5, Figs. 2 and 5, or other non-reacting, heat-resistant, finely granular material, which material is contained, eventually, by metal or other resistant plugs 7 inserted in or held at the ends of the molded article, or otherwise; at the same time the outer surface is compressed by winding thereon a coil made of a suitable temperature and binder resisting wire 9, Figs. 1 and 2, or metal ribbon 15, Figs. 4 and 5, the optimum spacing between adjacent coils being in the neighborhood of one-sixteenth of an inch, but shown exaggerated on the drawing; or the form may be enclosed in a wire mesh 11, Fig. 7, of suitable dimensions, or other foraminous metal casing 12, Figs. 1, 2 and 3, by binding or clamping the same tightly against the surface, Figs. 1 and 2, or the form may be surrounded with a coiled or continuous strip of metal foil 25, shown exaggerated in thickness in Fig. 8, with a broken edge at 26, which is also firmly held; or it may be enclosed in a mass of granular material, for example, sand 17, Fig. 2, so that both surfaces are held under compression by the granular material; or one or both surfaces of the form may be held in position by a sheet of wood or similar carbonizable material 19, Fig. 6, which at the high temperature of manufacture chars and furnishes a non-reacting contact surface of carbon; or both mica surfaces may be held under compression by application of discontinuous metal surfaces 22, 23, Fig. 4, and 25, Fig. 8, as above described; or in other ways that will be familiar to those acquainted with this art of molding.

Protected in this way against delamination during baking, the article is then heated to about the temperature stated above, 540° C.–620° C., (1004 to 1148° F.), for a long enough time to convert the binder completely to the viscous adhesive state of low or negligible water content. In practice, this may occupy a half hour. Thereafter the tube is cooled with or without annealing, to permit the binder to become solid; the inner and outer surface compressors are then completely removed and the product cleaned if necessary and finished by burring, rubbing, lacquering, or by any other means, as desired.

Articles thus formed are hard, tough, coherent, homogeneous, resistant to immersion in water over many hours, of high electrical resistance, unchanging with variations of temperature and humidity, and of course, are unchanged in use up to the temperature of manufacture. Furthermore, there is little or no permanent shrinkage or expansion in the baking process so that reasonably exact dimensions can be secured.

The process for making molded products other than cylinders, or tubes is quite similar. Commutator rings and similar products requiring deformation in three dimensions in the process of manufacture may be prepared in molds heated to a temperature sufficiently high to give the desired thermoplastic flexibility to the binder, and depending, as previously described, on the temperature of prior heating. Cones, barrel shaped objects, hemispheres, etc., are shaped while still flexible, then baked while the surfaces are kept under compressions as described above.

When it is desirable to use as the binder some other material than that mentioned specifically above, the process is not greatly changed. The following typical examples of additional conditions controlling use of other binders may be cited:—

(1) When a binder is selected that fuses at a temperature above 650° C. (1202° F.) only certain varieties of mica may be employed in the preparation of the laminated sheet. Such a binder is, for example, a combination of sodium monoborate with one or more crystallization restraining substances, for example, sodium arsenite, or tri-sodium phosphate, as described in detail in said Boughton application 546,154. Molded objects prepared thus may be subjected to temperatures as high as about 815° C. (1500° F.) without great loss of strength or other desirable properties, and have a high resistance to disintegration by water, as well as by organic fluids.

(2) By using a combination of sodium metaphosphate with suitable crystallization restraining substances, (see Boughton application 546,154), molded objects can be prepared that will, after preparation, again become soft and moldable at any desired temperature up to the maximum temperature of prior heating; for example to 300° C. (or 572° F.), as described above when sodium metaphosphate alone is employed. Thus, when a modified metaphosphate binder is employed the resoftening temperature may be set at any desired temperature by carrying the baking temperature to a point about 10° C.–40° C. higher than the desired resoftening temperature.

When sodium monoborate is used as a binder the process, though essentially of the same general nature as that employed when sodium metaphosphate is used, nevertheless involves certain essential differences in detail.

Sodium metaphosphate forms a substantially anhydrous viscous mica-bonding fluid at a temperature above about 600° C. (1112° F.). Sodium monoborate, on the other hand, forms such a fluid only at temperatures upwards of 800° C. (1472° F.).

Since ordinary India or amber mica decomposes between approximately 600° C.–700° C. (1112° F.–1292° F.), these varieties furnish satisfactory products when sodium metaphosphate is used as the binder, but do not withstand the temperatures required when sodium monoborate is employed. For the latter, varieties of mica must be employed that withstand temperatures in the neighborhood of 800° C. (1472° F.). These though not common are commercially available and need not be further described here.

Using, therefore, a high temperature mica and a concentrated (40%±) aqueous solution of sodium monoborate (in which part or all of the salt is in colloidal association with the water, yielding a viscous adhesive aqueous liquid of the kind employed in this work), a plate is built up, formed into shape while still in the flexible condition, dried, reheated, etc., and the surfaces placed under compression just as described above (metaphosphate binder). It is then baked as before, but at temperatures upward of about 800° C. (1472° F.) for the usual time, and then cooled, removed, finished, etc., as described.

A product such as a tube, made in this way, withstands temperatures up to that of its manufacture without delamination or softening, until approximately the manufacturing temperature is reached.

A further advantage offered by this process and the materials employed, is that the laminated sheet in a soft or moldable condition (at any operative temperature) may be molded around a device or object in fixed position, placed under compression, and then, while the surfaces are held under compression, baked in situ, to produce a molded laminated mica protecting coating, covering, etc., fixed in position upon said device or object and capable thereafter of affording all of the temperature and electrical resistant properties indicated above.

Production of laminated mica molded products capable of use at high temperatures greatly broadens the fields of use of such products. Some of the uses to which these products may be put, for which similar organic-bound products are of limited or of no use, are as follows: High temperature electrical heating element supports in flat irons and other electrical appliances; immersion and surface heaters, space heaters; flame protectors, direct heat protectors, molded resistance wire supports of many kinds, and the like.

We claim:—

1. The method of forming molded products, which comprises preparing a composite mica sheet of the desired thickness of layers of mica flakes, said flakes cemented together to form said sheet with an aqueous inorganic adhesive selected from the group consisting of reversibly thermoplastic metaphosphate compounds and alkali metal monoborates, shaping said composite mica sheet while still flexible and unbaked into a desired form, drying, sustaining said form under pressure in a vented form-retaining agent, and baking said shaped form at a temperature above approximately 500° F.

2. The method of forming molded laminated mica products in accordance with claim 1, in which a plurality of built-up mica sheets are superimposed and cemented together to form a shaped product.

3. The method in accordance with claim 1, in which the inorganic adhesive comprises an aqueous colloidal association of an alkali metal metaphosphate compound.

4. The method in accordance with claim 1, in which the inorganic adhesive comprises an aqueous colloidal association of an alkali metal metaphosphate compound and a small proportion of a crystallization restraining substance.

5. The method in accordance with claim 1, in which the inorganic adhesive comprises an aqueous colloidal association of sodium monoborate.

6. The method in accordance with claim 1, in which the inorganic adhesive comprises an aqueous colloidal association of sodium monoborate and a small proportion of a crystallization restraining substance.

7. The method in accordance with claim 1, in which the mica product is baked at a temperature of upwards of about 1112° F.

8. The method in accordance with claim 1, in which the mica product is baked at a temperature of upwards of about 1500° F.

9. The method of forming a molded hollow form of rounded cross section from mica flakes, which comprises preparing a composite mica sheet of the desired thickness of layers of mica flakes, said flakes cemented together to form said sheet with an aqueous inorganic adhesive selected from the group consisting of reversibly thermoplastic metaphosphate compounds and alkali metal monoborates, rolling a plurality of layers of said sheet while still flexible and unbaked into a hollow form of rounded cross section and applying said adhesive between said layers, placing said rounded form under pressure by a vented form-retaining agent, drying and baking said rounded form while under pressure at a temperature above approximately 500° F.

10. The method of forming mica coatings upon objects and the like, which comprises applying a layer or layers of assembled flexible unbaked mica sheet or sheets to the surface to be coated with mica, applying a coating of an aqueous inorganic adhesive between superimposed mica sheet layers, maintaining said mica coating under pressure upon said surface, and drying and baking said coated object while still under pressure at a temperature above approximately 500° F.

11. The method of forming mica coatings upon objects and the like, which comprises applying a coating of an aqueous inorganic adhesive to at least one of the contacting surfaces, applying a layer of assembled flexible mica sheet or sheets to the surface to be coated with mica, maintaining said mica coating under pressure upon said surface, and drying and baking said coated object while still under pressure at a temperature above approximately 500° F.

WILLIS A. BOUGHTON.
WILLIAM R. MANSFIELD.